US007350999B2

(12) United States Patent
Brletich et al.

(10) Patent No.: US 7,350,999 B2
(45) Date of Patent: Apr. 1, 2008

(54) TRASH CAN PLUG

(75) Inventors: Michael F. Brletich, Lake Forest, IL (US); Robert L. Kempf, Charlotte, NC (US)

(73) Assignee: Illinois Tool Works Inc., Glenview, IL (US)

( * ) Notice: Subject to any disclaimer, the term of this patent is extended or adjusted under 35 U.S.C. 154(b) by 3 days.

(21) Appl. No.: 10/632,545

(22) Filed: Aug. 1, 2003

(65) Prior Publication Data

US 2004/0108320 A1 Jun. 10, 2004

Related U.S. Application Data

(60) Provisional application No. 60/430,992, filed on Dec. 4, 2002.

(51) Int. Cl.
*F16B 21/08* (2006.01)
*F16B 21/06* (2006.01)

(52) U.S. Cl. .......................................... 403/10; 403/329

(58) Field of Classification Search .................. 403/10, 403/155, 302, 308, 329, 409.1, DIG. 14, 403/167, 168, 240, 263, 109.2, 109.3; 138/89, 138/89.4; 411/508, 510; 16/2.1, 2.3; 285/901, 285/921
See application file for complete search history.

(56) References Cited

U.S. PATENT DOCUMENTS 3,119,299 A * 1/1964 Sarafinas .................... 411/508
3,476,008 A * 11/1969 Ford et al. .................. 411/508
3,481,242 A * 12/1969 Topf .......................... 411/510
3,483,787 A * 12/1969 Saunders .................... 411/510
3,908,235 A * 9/1975 Telliard et al. ............. 411/508
4,604,014 A * 8/1986 Frano ......................... 411/510
4,674,910 A * 6/1987 Hayashi ...................... 411/508
4,711,595 A * 12/1987 Magid et al. ............... 403/329
4,850,735 A * 7/1989 Hansen et al. .............. 403/329
4,898,493 A * 2/1990 Blankenburg ........ 403/DIG. 14
4,956,900 A * 9/1990 Mair ................... 403/DIG. 14
5,029,819 A * 7/1991 Kane
5,031,266 A * 7/1991 Tillman et al. ............. 403/329
5,144,780 A * 9/1992 Gieling et al. .............. 403/292

(Continued)

FOREIGN PATENT DOCUMENTS

DE 19730672 A1 * 2/1998

(Continued)

*Primary Examiner*—David Bagnell
*Assistant Examiner*—Ernesto Garcia
(74) *Attorney, Agent, or Firm*—Mark W. Croll; Paul F. Donovan

(57) ABSTRACT

A fastener and plug device for mounting a trashcan bar to a trashcan and for covering the hollow ends of the trashcan bar includes a plug portion and a fastener portion. The plug portion includes an end cap and a plurality of spaced apart discs for enclosing the openings in the ends of the trashcan bar. The fastener portion includes an extension member extending outwardly from the end cap for engaging and extending through an aperture in the trashcan bar for securing the trashcan bar to the trashcan. The fastener and plug device of the invention reduces the known multiple steps of installing the trashcan bar onto the trashcan, eliminates the use of multiple fasteners typically needed to secure the trashcan bar to the trashcan, is installable in the field, and permits the trashcans to be more easily stackable for storage and transportation.

13 Claims, 5 Drawing Sheets

U.S. PATENT DOCUMENTS 5,184,377 A * 2/1993 Ragsdale et al. .......... 24/704.1
5,226,808 A * 7/1993 Harley ....................... 411/508
5,233,870 A * 8/1993 Peroni ........................ 411/508
5,387,065 A * 2/1995 Sullivan ..................... 411/510
5,496,141 A * 3/1996 Popsys ....................... 411/510
5,560,253 A * 10/1996 Ishikawa et al. ............ 403/330
5,651,632 A * 7/1997 Gordon ...................... 403/329
5,788,347 A * 8/1998 Rabinovitz .................. 403/329
5,934,729 A * 8/1999 Baack ........................ 411/510
5,992,953 A * 11/1999 Rabinovitz .................. 403/329
6,003,556 A * 12/1999 Brugger et al. ............... 138/89
6,058,977 A * 5/2000 Hotta .......................... 138/89
6,079,894 A * 6/2000 Obitts ..................... 403/109.3
6,119,306 A * 9/2000 Antonucci et al. .......... 411/550
6,304,452 B1 * 10/2001 Lo ............................ 361/704
6,305,892 B1 * 10/2001 Qiao .......................... 411/510
6,343,890 B1 * 2/2002 Benson ....................... 403/329
6,360,779 B1 * 3/2002 Wagner et al. ................ 52/514
6,634,827 B2 * 10/2003 Quinn et al. ................ 403/329
6,634,843 B1 * 10/2003 Tarnow et al. .............. 411/508
6,659,411 B2 * 12/2003 Araki ......................... 248/615
6,740,812 B2 * 5/2004 DeWitt et al. ................ 16/2.1
6,799,931 B2 * 10/2004 Kwilosz ..................... 411/510

FOREIGN PATENT DOCUMENTS

GB 520169 A * 4/1940
JP 2003001335 A * 1/2003

* cited by examiner

TRASH CAN PLUG

CROSS REFERENCE TO RELATED APPLICATION

This Non-Provisional Application claims benefit to U.S. Provisional Application Ser. No. 60/430,992 filed Dec. 4, 2002.

FIELD OF THE INVENTION

The present invention relates generally to industrial trashcans and more particularly to a fastener and plug device for use with an industrial trashcan.

BACKGROUND OF THE INVENTION

Various industrial trashcans are known. These known trashcans are typically used to contain trash until the trash is removed by an automated trash removal system. Known industrial trashcans are designed to accommodate two different methods of automated trash removal. The first method includes the use of a claw device that grabs and clamps the outside of the trashcan. The second method includes the use of two hooks—one hook grabs the top of the trashcan and the other hook grabs onto a bar positioned approximately midway down the side of the trashcan. With both methods, the trashcan is lifted over the container section of a truck and the trashcan is then turned upside down to cause the trash to fall out of the trashcan and into the truck's container section. Known trashcans must endure repeated use and be useable with either known method of automated trash removal. Consequently, existing industrial trashcans must include or be fitted with the trashcan bar located midway down the side of the trashcan. Typically, the installation of this bar requires several steps. One step requires the placement of plugs into the ends of the bars, which are typically hollow. The plugs provide protection against animal infestation and inhabitation. A second step requires the mounting of the bars onto the sides of the trashcans. A third step requires the securement of the bar to the side of the trashcan through the use of multiple rivets or other fasteners.

The known method of installing the trashcan bar onto the side of the trashcan, however, has several drawbacks. As an example, when the trashcan is grabbed and clamped by the automated trash removal process, the rivets securing the bar sometimes shear off and the bar will fall off of the trashcan. Moreover, the multiple-step installation of the bar onto the trashcan is time consuming, difficult, and expensive. Consequently, there is a need in the art for a technique for mounting the trashcan bar to the trashcan that overcomes the known drawbacks and shortcomings with existing techniques for installing the bars onto the trashcans.

SUMMARY OF THE INVENTION

The present invention is directed to a technique for mounting a trashcan bar to a trashcan. The technique of the present invention includes the use of a mountable fastener plug that covers the opening in the end of the bar and also secures the bar onto the trashcan. The present invention reduces the known multiple steps of installing the bar onto the trashcan, eliminates the use of multiple fasteners typically needed to secure the bar to the trashcan, eliminates the need for separate fasteners and hole plugs, and is installable in the field. The installation of the invention results in an opening between the plug body and the interior wall of the trashcan bar to allow for unwanted water or waste to drain out of the trashcan bar and to prevent animal infestation within the trashcan bar. The present invention further permits the trashcans to be more easily stackable for storage and transportation.

Other features and advantages of the invention will become apparent to those skilled in the art upon review of the following detailed description, claims and drawings in which like numerals are used to designate like features.

Figure 1:
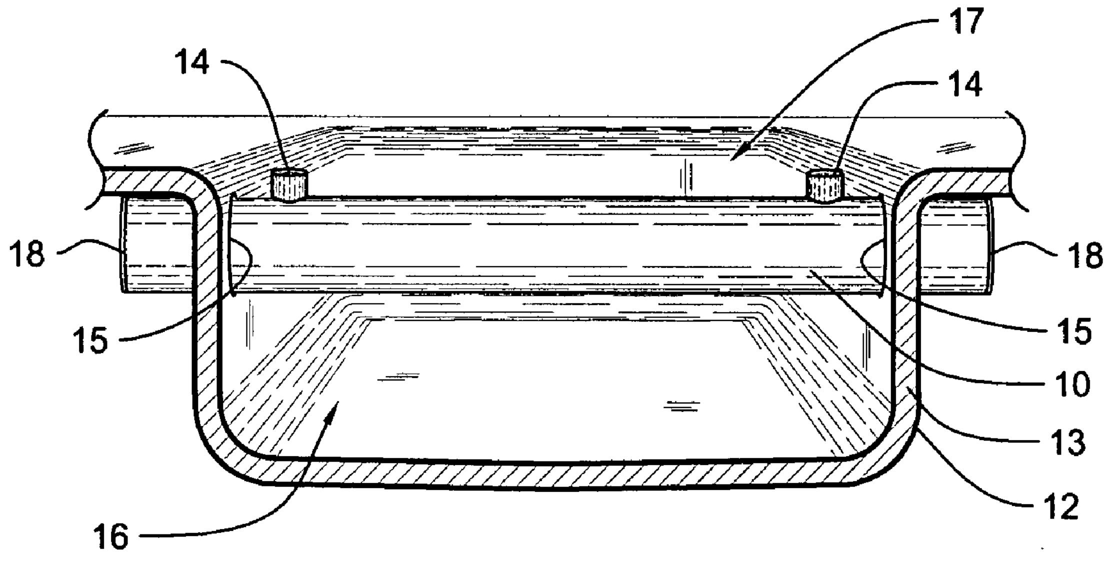
FIG. 1 (Prior Art)
FIG. 1 shows a side view of a prior art mounting of a bar onto a trashcan.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof are meant to encompass the items listed thereafter and equivalents thereof as well as additional items and equivalents thereof

DETAILED DESCRIPTION OF THE EMBODIMENTS

Referring to FIG. 1, there is depicted a prior art assembly of a trashcan bar to an industrial trashcan. As depicted, the trashcan bar 10 is fastened to the sidewall of the trashcan 12 through the use of multiple rivets 14. The trashcan bar 10 extends across an opening 16 formed by the sidewall 13 of the trashcan 12 and through opposing holes 15 formed in the sidewall 13. The opening 16 is formed on the outside 17 of the trashcan 12. The multiple rivets 14 are positioned on each end of the trashcan bar 10 within the opening 16 and therefore on the outside 17 of the trashcan 12. The multiple rivets 14 secure the trashcan bar 10 to the trashcan 12 by preventing slidable movement of the trashcan bar 10 through the opposing holes 15. Occasionally, the multiple rivets 14 shear off when the trashcan bar 10 is grabbed by the automated trash removal equipment.

Located at the ends of the trashcan bar 10, which conventionally has a hollow interior, are hole plugs 18 that are mounted into the openings formed at each end of the hollow trashcan bar 10. The hole plugs 18 prevent animal infestation within the trashcan bar 10 and keep water and waste out of the interior of the trashcan bar 10.

Figure 2:
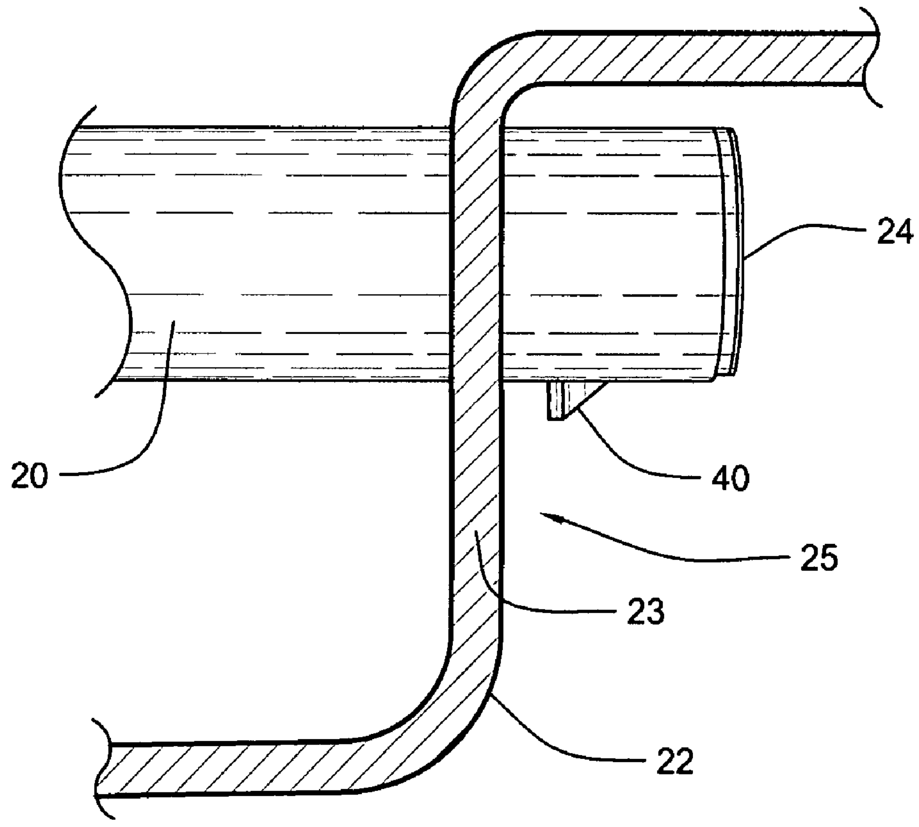
FIG. 2 shows a partial side view of one embodiment of the mounting of a bar onto a trashcan according to the present invention.
Figure 3:
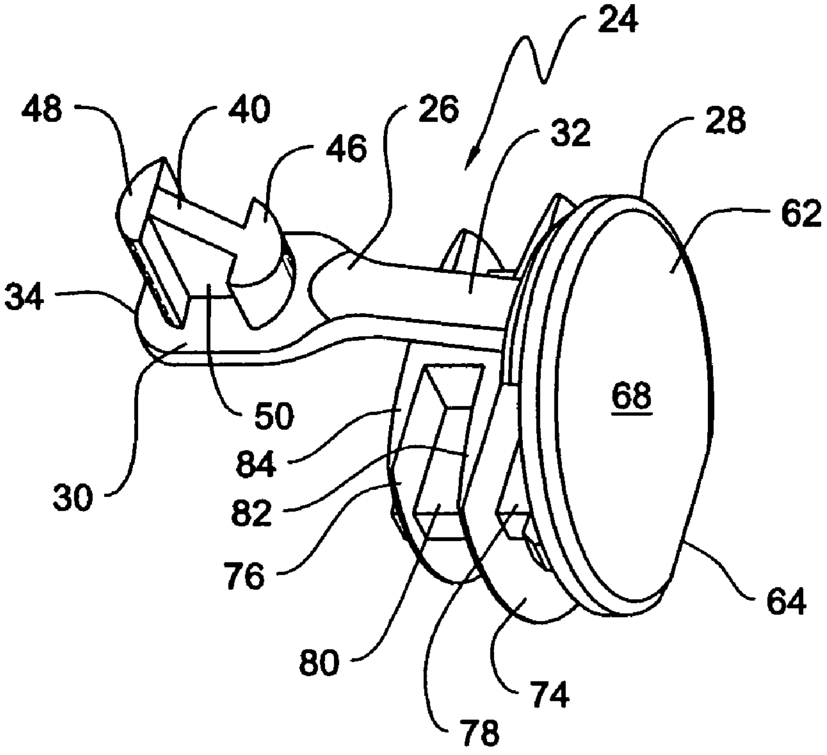
FIG. 3 shows an isometric view of an exemplary fastener and plug device of the present invention.
Figure 4:
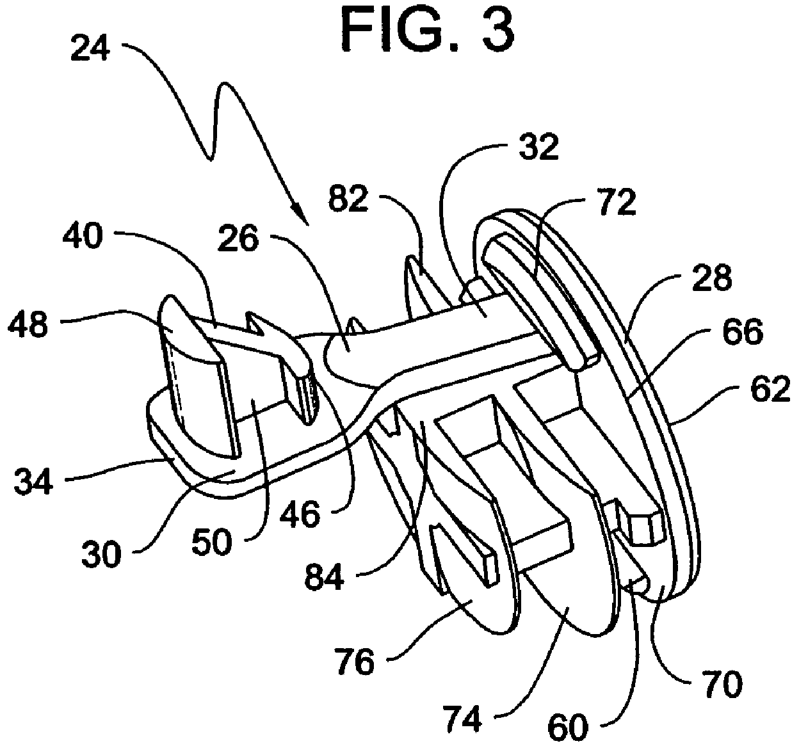
FIG. 4 shows another isometric view of the invention of FIG. 3.

Referring to FIG. 2, there is depicted a technique for mounting a trashcan bar to the trashcan according to the present invention. The trashcan bar 20 is secured to the trashcan 22 through the use of an exemplary fastener and plug device 24 of the invention (hereinafter referred to as a "fastener plug"). The fastener plug 24 is removably mounted to the ends of the bar 20 and serves as both a fastener to secure the trashcan bar 20 to the sidewall 23 of the trashcan 22 and as a plug to prevent water, waste, and animals from entering the ends of the trashcan bar 20. Unlike the prior art, the invention secures the trashcan bar 20 to the trashcan 22 from the inside 25 of the trashcan 22 and does not require additional fasteners, such as rivets, for its assembly. Also unlike the prior art, the invention secures the trashcan bar 20 onto the trashcan 22 without much assembly and can be installed in the field. In addition, the invention does not require separate plugs to cover the ends of the trashcan bar 20. Also, the invention permits the easy removal of the trashcan bar 20 from the trashcan 22.

Figure 7:
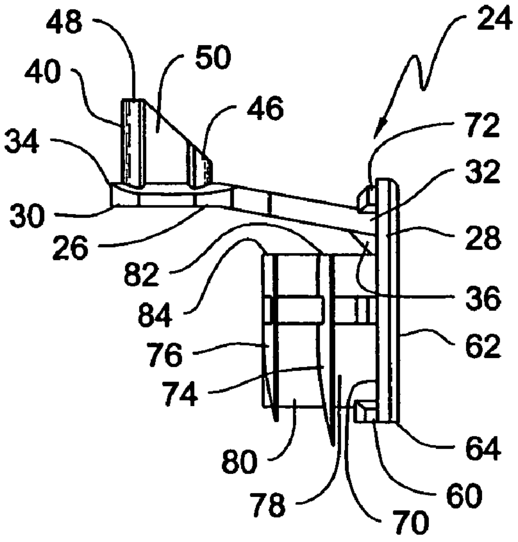
FIG. 7 shows a side elevation view of the invention of FIG. 3.

Referring to FIGS. 3-7, there are depicted various views of the exemplary fastener plug 24 of the present invention. The fastener plug 24 may be made of nylon or any other suitable material. The fastener plug 24 includes a fastener portion 26 and a plug portion 28. The fastener portion 26 is formed integral with and extends outwardly from the plug portion 28 near the peripheral edge 66 of the plug portion 28. The fastener portion 26 defines a paddle-shaped arm 30 and has a fixed end 32 and a free end 34. The fixed end 32 is attached to, or formed integral with, the plug portion 28 and further includes a support rib 36 positioned below the fixed end 32, as depicted in FIG. 7. The fastener portion 26 extends outwardly and slightly upwardly from the plug portion 28. With this configuration, the fastener portion 26 will have a resiliency or springiness relative to the plug portion 28. This will permit the arm 30 to flex as the fastener plug 24 is installed in the hollow end of the trashcan bar 20 and will snap back to its original shape and position when a projecting member 40, described below, passes through an opening or aperture 44, described below, in the trashcan bar 20.

Figure 8:
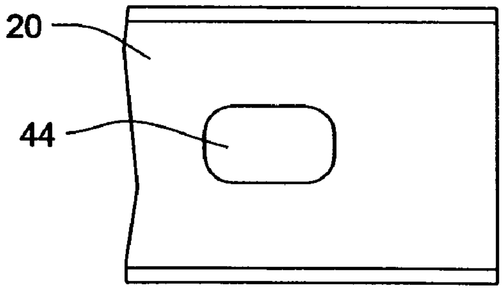
FIG. 8 shows a partial view of a trashcan bar on which is mounted the invention of FIG. 3.

Located at the free end 34 of the fastener portion 26 is the projecting member 40. The projecting member 40 defines an upwardly extending, inclined protuberance that, in use, will fit within and through an opening or aperture 44 formed in the cylindrical wall of the trashcan bar 20, as illustrated in FIGS. 2 and 8. The projecting member 40 is sized, shaped, and configured to extend through the opening 44 and will assist in anchoring or securing the fastener plug 24 onto the trashcan bar 20. Once installed, the projecting member 40 of the fastener plug 24 secures the trashcan bar 20 onto the trashcan 22, as illustrated in FIG. 2. Specifically, and as assembled, the projecting member 40 extends through the opening 44 and outwardly from the exterior of the trashcan bar 20. With the fastener plug 24 installed on both ends of the trashcan bar 20, the projecting member 40 will serve as a lug or restraint to prevent the longitudinal and slidable movement of the trashcan bar 20 out of the sidewall 23 of the trashcan 22, thereby securing the trashcan bar 20 onto the trashcan 22.

In an exemplary embodiment, the projecting member 40 defines a pair of opposing semi-cylindrical shaped columns 46, 48 extending outwardly from the paddle shaped arm 30 that are joined together by a support rib 50 extending between the columns 46, 48. The column 46 and support rib 50 define an inclined surface that, in use, facilitates the insertion and removal of the projecting member 40 within and out of the opening 44 formed in the trashcan bar 20. The column 48 of the projecting member 40 serves as the lug or restraint to prevent the trashcan bar 20 from sliding out of the trashcan 22. It should be understood that other shapes, configurations, and designs of the fastener portion 26 are possible with the invention and still provide for the removable securement of the fastener plug 24 to the trashcan bar 20, and also the securement of the trashcan bar 20 to the trashcan 22.

The plug portion 28 of the fastener plug 24 defines generally a round-shaped body that is sized and configured to seat within the hollow ends of the cylindrical trashcan bar 20 and to serve as a cap or plug to prevent water, waste and animals from entering the ends of the trashcan bar 20. The plug portion 28 includes a generally round-shaped end cap 62 having a flat bottom edge 64. As installed in the hollow end of the trashcan bar 20, the end cap 62 will seal the opening in the end of the trashcan bar 20 to prevent objects and other items and things, such as amimals, from entering the trashcan bar 20, while the flat bottom edge 64 creates an opening or slit to permit water or waste to drain out of the trashcan bar 20. The end cap 62 defines a peripheral edge 66 and has an outer surface 68 and an inner surface 70. Extending outwardly from the inner surface 70 near the peripheral edge 66 is an arc-shaped rib 72 that is positioned adjacent to and above the fixed end 32 of the fastener portion 26. The arc-shaped rib 72 serves as a retaining wall to control the radial movement of the fastener portion 26 and is sized and shaped to seat the end cap 62 into the hollow ends of the trashcan bar 20. A second rib 60 is located at the bottom edge 64 on the inner surface 70 of the end cap 62 to also assist in seating the end cap 62 into the hollow ends of the trashcan bar 20.

Figure 5:
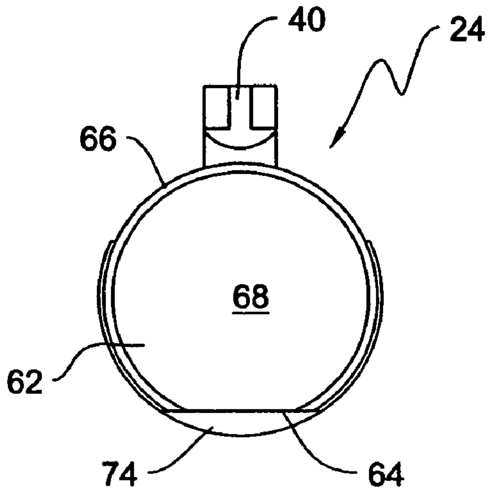
FIG. 5 shows a front elevation view of the invention of FIG. 3.
Figure 6:
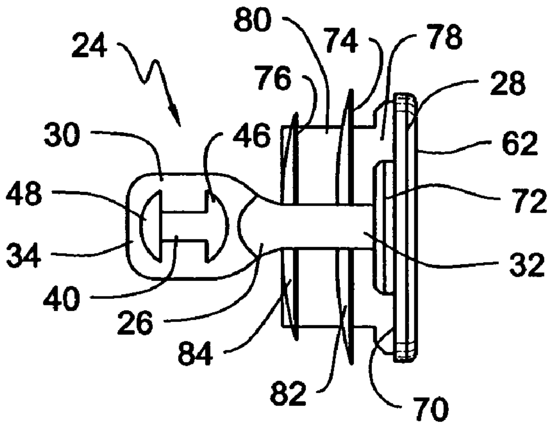
FIG. 6 shows a top plan view of the invention of FIG. 3.

Spaced apart from the end cap 62 are discs, or referred to as disc-shaped members 74, 76 that assist in sealing the hollow ends of the trashcan bar 20 and in securing the plug portion 28 to the trashcan bar 20. The discs or disc-shaped members 74, 76 are separated from each other, and yet joined together and to the end cap 62, by ribs 78, 80. The ribs 78, 80 provide structural support for the disc shaped members 74, 76. The discs or disc-shaped members 74, 76 define respective flat end surfaces 82, 84 that permit the fastener portion 26 to extend across and above the plug portion 28. The disc-shaped member 74 is positioned between the end cap 62 and the disc-shaped member 76 and defines a diameter slightly larger than the diameter of the end cap 62, as shown in FIG. 5. The disc-shaped member 74 is sized and shaped to mate with and seal the hollow ends of the trashcan bar 20 and to assist in securing the plug portion 28 to the trashcan bar 20. As depicted in FIG. 5, the disc-shaped member 74 extends below the flat bottom edge 64 of the end cap 62, such that when the plug portion 28 is installed into the trashcan bar 20, will create a seal between the plug portion 28 and the trashcan bar 20 at the bottom to prevent items or objects from entering into the hollow interior of the trashcan bar 20.

Figure 9:
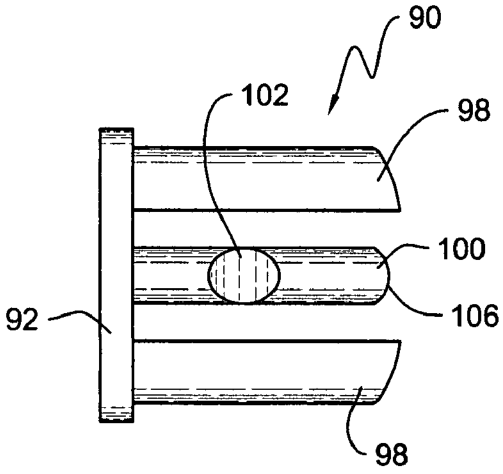
FIG. 9 shows a top plan view of another embodiment of the present invention.
Figure 10:
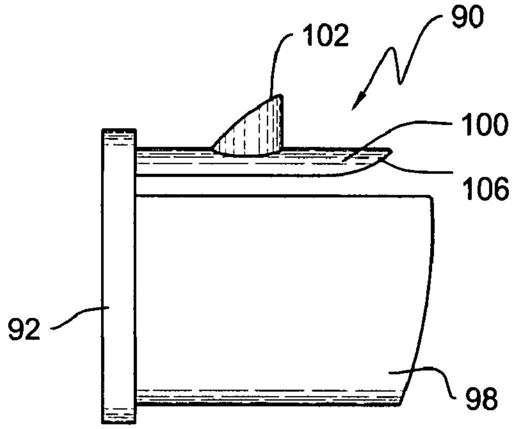
FIG. 10 shows a side view of the embodiment of FIG. 9.
Figure 11:
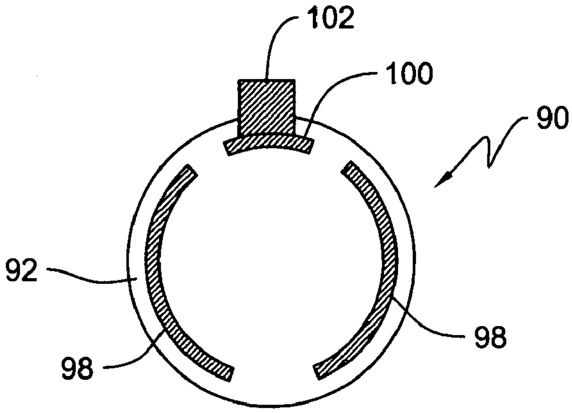
FIG. 11 shows an end view of the embodiment of FIG. 9.

Referring to FIGS. 9-11, there is depicted another exemplary embodiment of the present invention. The fastener plug 90 includes an end cap 92 for covering and sealing the hollow ends of the trashcan bar. The fastener plug 90 further includes opposing semi-cylindrical shaped extensions 98 extending outwardly from the end cap 92. The extensions 98 are sized, shaped, and configured for mating with the interior wall of the hollow trashcan bar. Also extending outwardly from the end cap 92 is a fastener extension 100 including an inclined protuberance 102 extending outwardly from the extension 100 for engaging with an opening or aperture in the trashcan bar, as described above. The extension 100 will have a resiliency and springiness that permits the end 106 of the extension 100 to move radially. The radial movement of the extension 100 will assist in the engagement of the inclined protuberance 102 into the opening or aperture in the trashcan bar.

Figure 12:
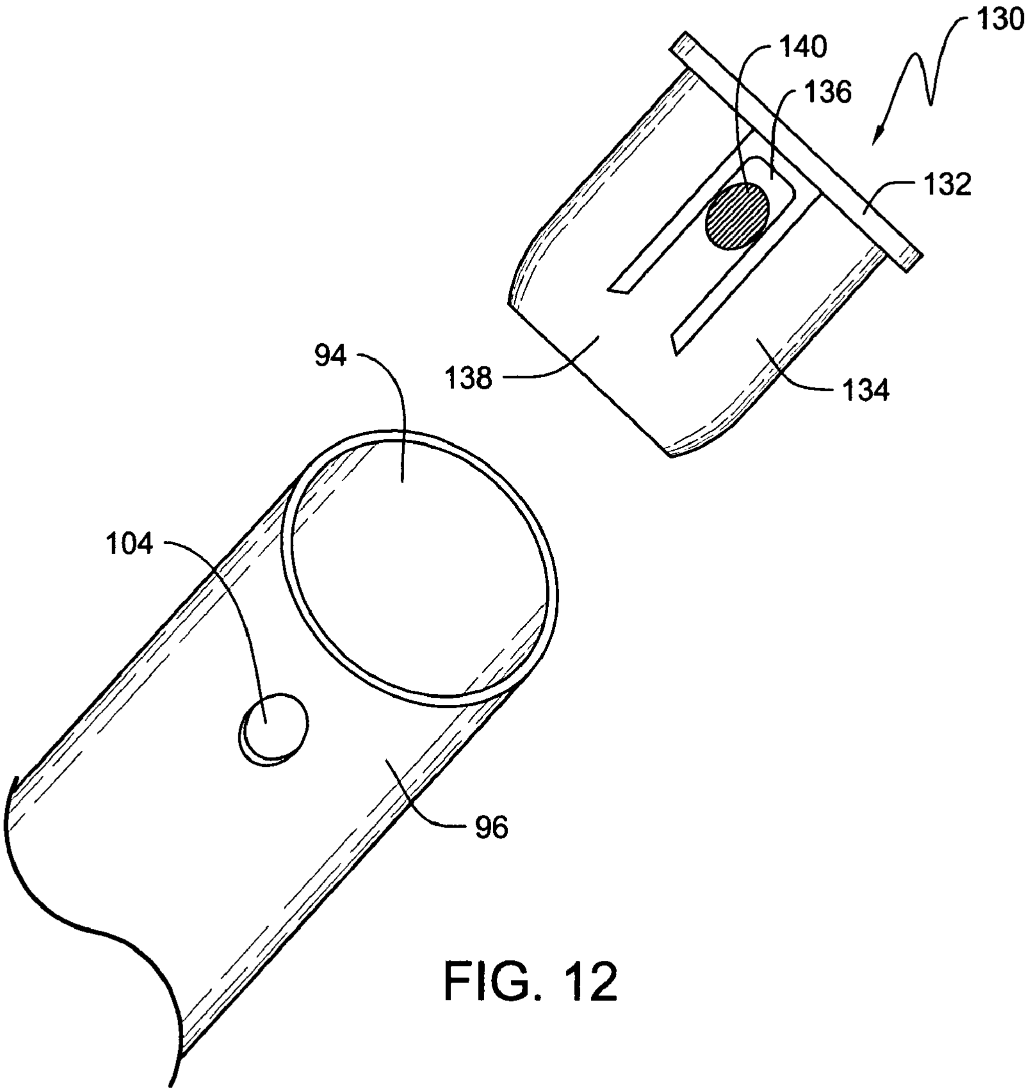
FIG. 12 shows an exemplary assembly of the another embodiment of the present invention.

Referring to FIG. 12, there is depicted yet another exemplary embodiment of the present invention. The fastener plug 130 includes an end cap 132 for covering and sealing the end 94 of a trashcan bar 96 and a cylindrical body 134 extending outwardly from the end cap 132 for fastening the fastener plug 130 to the trashcan bar 96. The cylindrical body 134 further includes an extension 136 extending outwardly from the end 138 of the cylindrical body 134 toward the end cap 132. Located on the exterior surface of the extension 136 is a protuberance 140 that is sized and shaped to engage with and extend through an opening 104 in the trashcan bar 96. The engagement of the protuberance 140 within and through the opening 104 in the bar 96 secures the fastener plug 130 to the bar 96 and the bar 96 to the trashcan, as discussed above. The extension 136 will permit the disengagement of the protuberance 140 from the opening 104 upon a user pressing the protuberance 140 back through the opening 104. Once the protuberance 140 is disengaged, the fastener plug 130 may be removed from the trashcan bar 96.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A device for securing a bar to a trashcan, the bar including open ends and defining a sidewall having an aperture in the sidewall, the device comprising:

a fastener plug mountable to the open ends of the bar, the fastener plug including an end cap and at least one disc spaced apart and connected to the end cap, the fastener plug including a flexible extension member extending outwardly from the end cap, across and spaced apart from the at least one disc, the extension member having a fixed end connected to the end cap and a free end opposite the fixed end, the free end including an aperture engaging-member for operatively engaging the aperture in the sidewall of the bar, wherein the end cap defines a peripheral edge and a flat truncated surface along the peripheral edge, and wherein the aperture engaging member defines opposing columns joined together by a rib, the opposing columns and rib form an inclined surface.

2. The device as set forth in claim 1, wherein the aperture in the sidewall of the bar extends completely through the sidewall, and wherein the fastener plug includes a plug portion and a fastener portion, the plug portion defining the end cap and the at least one disc, the end cap including at least one retaining wall extending outwardly from an inner surface of the end cap, the at least one disc being sized and shaped to mate with and seal the open end of the bar, the at least one disc defining a diameter adapted to be slightly larger than the diameter of the open end of the bar, the fastener portion defining the flexible extension member, the aperture engaging-member being a projecting member adapted for operatively engaging the aperture in the sidewall of the bar such that the flexible extension member flexes as the flexible member is installed in the open end of the bar and snaps back to its original position when the projecting member is placed within and extends through the aperture in the sidewall of the bar.

3. The device as set forth in claim 2, wherein a rib connects the at least one disc to the end cap.

4. The device as set forth in claim 2, wherein the at least one disc is a plurality of discs spaced apart from the end cap.

5. The device as set forth in claim 2, wherein the extension member extends upwardly from the end cap.

6. The device as set forth in claim 4, wherein the extension member extends across the plurality of discs.

7. The device as set forth in claim 6, wherein the plurality of discs define a flat surface edge.

8. The device as set forth in claim 2, wherein the projecting member defines an inclined surface.

9. The device as set forth in claim 1, wherein a rib connects the at least one disc to the end cap.

10. The device as set forth in claim 9, wherein the at least one disc is a plurality of discs spaced apart from the end cap.

11. The device as set forth in claim 10, wherein the extension member extends upwardly from the end cap.

12. The device as set forth in claim 10, wherein the extension member extends across the plurality of discs.

13. A device for securing a bar to a trashcan, the bar including open ends and defining a sidewall having an aperture in the sidewall, the device comprising:

a fastener plug mountable to the open ends of the bar, the fastener plug including an end cap and at least one disc spaced apart and connected to the end cap, the fastener plug including an extension member extending outwardly from the end cap and across the at least one disc, the extension member having a fixed end connected to the end cap and a free end opposite the fixed end, the free end including an aperture engaging-member for operatively engaging the aperture in the sidewall of the bar, wherein the aperture engaging member defines opposing columns joined together by a rib, the opposing columns and rib form an inclined surface.

* * * * *